United States Patent [19]
Kato et al.

[11] Patent Number: 6,037,042
[45] Date of Patent: Mar. 14, 2000

[54] LABEL SHEET AND METHOD OF MANUFACTURING THE SAME

[75] Inventors: Takahiro Kato, Itabashi-ku; Yoshiyki Takemura, Sendai; Tsutomu Sakai, Hachiohji; Takeshi Hiwatari, Tsurugashima; Kenji Takahashi, Adachi-ku, all of Japan

[73] Assignee: Toppan Moore Co., Ltd., Tokyo, Japan

[21] Appl. No.: 08/891,496

[22] Filed: Jul. 11, 1997

Related U.S. Application Data

[63] Continuation of application No. 08/509,245, Jul. 31, 1995, abandoned.

[30] Foreign Application Priority Data

| Oct. 26, 1994 | [JP] | Japan | ................................. 6-285912 |
| Nov. 30, 1994 | [JP] | Japan | ................................. 6-321696 |
| Feb. 28, 1995 | [JP] | Japan | ................................. 7-066921 |

[51] Int. Cl.$^7$ ................................. B32B 3/10; B05D 5/00
[52] U.S. Cl. ......................... 428/195; 428/198; 428/343; 428/352; 428/446; 428/452; 428/43; 427/511; 427/514; 427/515; 427/208.6; 427/208
[58] Field of Search ............................... 283/81; 428/185, 428/343, 913, 914, 174, 43, 198, 352, 354, 446, 452; 427/207.1, 208.6, 209, 288, 508, 510, 511, 514, 515

[56] References Cited

U.S. PATENT DOCUMENTS

| 3,773,538 | 11/1973 | Milutin et al. . | |
| 4,138,527 | 2/1979 | Malek | ................................. 428/425 |
| 4,307,526 | 12/1981 | Wippern | ................................. 40/2 R |
| 4,479,316 | 10/1984 | Wippern | ................................. 40/2 R |
| 4,768,810 | 9/1988 | Mertens . | |
| 5,154,962 | 10/1992 | Mertens et al. | ......................... 428/41.8 |
| 5,354,588 | 10/1994 | Mitchell et al. | ......................... 428/41.6 |
| 5,543,192 | 8/1996 | Shipston et al. | ......................... 428/40.6 |
| 5,578,352 | 11/1996 | Smith | ................................. 428/40.1 |

*Primary Examiner*—Marie Yamnitzky
*Attorney, Agent, or Firm*—Weingarten, Schurgin, Gagnebin & Hayes LLP

[57] ABSTRACT

A label sheet comprises a substrate and an adhesive layer formed by applying an adhesive agent to a surface of the substrate, said adhesive layer being formed only on a limited area of the surface. With such an arrangement and if it is part of a larger label sheet or a multi-layer structure of label sheets, it can be stripped off easily from the remaining part. If perforations are formed in adhesive free areas, they do not produce any projections of the applied adhesive agent so that the final product can be handled with ease. Additionally, by forming an adhesive-repellent layer on the outer surface with an ink type adhesive-repellent agent, the overall manufacturing process can be simplified and the product is adapted to making by hand.

15 Claims, 8 Drawing Sheets

LABEL SHEET AND METHOD OF MANUFACTURING THE SAME

This application is a continuation of application Ser. No. 08/509,245, filed Jul. 31, 1995, now abandoned.

BACKGROUND OF THE INVENTION

1. Field of the Invention

This invention relates to a label sheet comprising a substrate carrying an adhesive layer on a surface thereof and, more particularly, it relates to a label sheet comprising a substrate carrying an adhesive layer on a surface thereof and printed information on the other surface that serves as a separable side of the label sheet, wherein said adhesive layer is formed only on a limited area of the surface and/or a parting layer is formed by application on the other surface in order to improve the separability of the label sheet, the efficiency of forming perforations in the label sheet and the adaptability to marking by hand of the separable side of the label sheet.

2. Background Art

A variety of label sheets are known to date and some of the popular applications of label sheets include post cards, envelopes, paper slips, parcels and packaged goods in the fields of mail, delivery, distribution and retailing to list a few. A typical label sheet comprises a substrate carrying printed information in a given area of a surface thereof, which information may be in the form of bar codes and represent the contents of a parcel or package, if the label sheet is to be applied to the parcel or package, and a layer of a pressure-responsive adhesive agent on the other surface. Such a label sheet may additionally comprise an adhesive-repellent cover sheet typically treated with silicon so that the adhesive layer of the label sheet is covered and protected by the cover sheet and the label sheet can be brought to actual use by stripping off the cover sheet from the label sheet with ease or, alternatively, the printed information carrying surface of such a label sheet may be directly treated with silicon to make it adhesive-repellent and operate as a cover sheet for the adhesive layer of another label sheet so that no separate and independent cover sheet may additionally be required. In either case, the label sheet may be part of a larger label sheet and can be separated from the remaining part by ripping it off along perforations and stripping off the cover sheet or simply removing the label sheet from an underlying sheet before it is applied to an object.

A known label sheet of the above described type will be described in greater detail by referring to FIG. 19 of the accompanying drawing n that shows a cross sectional view of a conventional label sheet. In FIG. 19, a rectangular label sheet 91 comprises a substrate 92, an ink layer 95 formed on a surface of the substrate 92 and carrying printed information therein, a separable cover layer 93 of an adhesive-repellent material formed on the ink layer 95 to cover and protect the printed information and an adhesive layer 94 formed on the other surface of the substrate 92. A number of such label sheets are arranged vertically on a one on the other basis to form a multi-layer structure in such a way that the separable cover layer 93 of a label sheet held in contact with the adhesive layer 94 of another label sheet placed directly on it and so on. Such a multi-layer structure of label sheets may be part of a larger rolled or flat label sheet product or a larger comprising a number of such multi-layer structures that are separable from each other along perforations. Thus, an individual label sheet can be separated from the remaining part by ripping it off along perforations and stripping off the cover sheet before is applied to an object.

A conventional label sheet as described above is, however, accompanied by a number of disadvantages. Firstly, since it carries an adhesive on the entire surface of the substrate, it may require s considerable effort for stripping it off from the underlying label sheet, although no particular measures have hitherto been taken to solve this problem. Thus, an attempt to strip off a single label sheet from the remaining label sheets can often end up with unintentionally taking up a number of label sheets at a time. Secondly, in the process of producing perforations in a larger label sheet for defining the boundaries of individual label sheets by means of a perforator, the adhesive can stick to the perforator to reduce the level of precision with which the perforating operation is carried out and give rise to unevenly distributed perforations, which by turn make the label sheets not easily separable and can result in deformed or damaged labels. Additionally, the larger label sheet and the perforator to which the adhesive is sticking may catch and bite each other as the former is fed in and out to cause a trouble of jamming and consequently a reduced productivity. Still additionally, as the perforator needle cuts through the substrate and comes out of it to form a perforation there, the substrate may rise and project around the perforation mainly because of the existence of the adhesive around the perforation. The net result of such projections will be a deformed roll if the perforated label sheets are taken up to form a roll. Such a deformed roll may be not only disagreeable in appearance but also clumsy in the motion of being fed out if it is fitted to a printer or a label holder. If a number of label sheets are not wound up to form a roll but stored as a stack, the adhesive can flow out from the lateral sides of the stack.

On the other hand, an adhesive-repellent agent is applied to the other surface of the substrate of the label sheet to form an adhesive-repellent layer that covers the characters and/or patterns printed on that surface. In other words, two different agents of the adhesive-repellent and the printing ink have to be used on the adhesive-repellent side of the label sheet, involving two separate processing steps, to make the overall label sheet rather thick and costly and the entire manufacturing operation inefficient and uneconomic.

Adhesive-repellent agents used for conventional label sheets typically contain silicon by between 65 and 95% by weight. With such a high silicon content, the surface of the adhesive-repellent layer in hardly adapted to marking by means of a felt-tipped marker, a pencil or a stamp. In other words, any additional information in the form of characters and/or patterns recorded on the exposed surface of the label sheet at the time when it is applied to an object can easily be wiped out by hand or some other thing that may happen to touch it by chance so that any such attempt will find itself abortive.

Known adhesive-repellent cover sheets used for covering and protecting conventional label sheets have to be thrown out once they are peeled off from the respective label sheets to make waste because they have been treated with silicon and hence not feasibly recycled. In an attempt to dissolve this problem, there have been proposed a multi-layer structure of label sheets, where the adhesive layer sides of two vertically successive label sheets are designed to be put together in such a way that each of the two adhesive layer sides is divided into adhesive areas and adhesive-repellent areas and the adhesive areas of either one of the two adhesive layer sides exactly corresponds to the adhesive-repellent areas of the oppositely disposed adhesive layer side. This arrangement is free from the above identified problems so long as the two label sheets are used at a same time. However, the two label sheets are not necessarily used at a same time and, if either one is used before the other one, the adhesive layer side of the remaining one has to be protected by some means so that it may not unintentionally stick to an object, requiring the user to give particular care to it. While the unused adhesive layer side may conceivably be stored by folding it in such a way that its adhesive areas respectively contact with the corresponding adhesive-repellent areas, such a practice will not be possible without exposing some of the adhesive areas. So there exists a demand for a label sheet of the category under consideration that is not accompanied by the above problems.

SUMMARY OF THE INVENTION

In view of the above problems, it is an object of the present invention to provide a label sheet comprising a substrate carrying on a surface thereof an adhesive layer formed only on a limited area of the surface to leave an adhesive free area on the surface so that it may be easily separated from an underlaying label sheet. If the label sheet is part of a larger label sheet from which it is separated by ripping it off along boundary perforations when it is used, the perforations may advantageously be formed in an area that is free from any adhesive so that no projections may be produced by the adhesive applied around the perforations.

Another object of the invention is provide a label sheet comprising a substrate carrying an adhesive layer on a surface thereof and an ink-made separable layer on the other surface, said ink containing an adhesive-repellent agent and a coloring agent. Characters and/or patterns may advantageously be printed on the label sheet by means of the ink.

Still another object of the invention is to provide a label sheet comprising a substrate carrying an adhesive layer on a surface thereof and an ink-made separable layer on the other surface, said ink containing an adhesive-repellent agent to a relatively low concentration so that additional information in the form of characters and/or patterns may be recorded on the separable layer and may not be wiped out by accident when the label sheet is actually used. Still another object of the invention is to provide a method of manufacturing such a label sheet.

A further object of the invention is to provide a label sheet comprising a substrate carrying an adhesive-repellent layer within a limited area and an information recording section in the remaining area of a surface thereof and an adhesive layer within a limited area and an adhesive free section in the remaining area of the other surface thereof, the area of said information recording section exactly corresponding to that of the adhesive free section.

If the above label sheet is part of a multi-layer structure of a number of such label sheets and has an adhesive free section and an adhesive layer on a same surface thereof, said adhesive free section and said adhesive layer dividing the surface into identical two halves, the adhesive free section may advantageously carry an adhesive-repellent layer and be arranged in such a way that, if the label is folded along a center line, the area of the adhesive layer is put to contact exactly with the area of the adhesive-repellent layer and that the area of the adhesive layer on the underside of the label sheet exactly corresponds to the area of the adhesive-repellent layer of the upper side of an underlying label sheet.

A label sheet according to the invention and having an adhesive free area on the adhesive layer carrying side of the sheet can be easily stripped off from the remaining portion of a larger label sheet comprising it as part thereof. If the perforations of the label sheet are formed in the adhesive free area, no projections may be produced by the adhesive applied to the substrate to make the label sheet easy to handle.

With a label sheet according to the invention and having an ink-made separable layer on a surface of the substrate, said ink containing an adhesive-repellent agent and a coloring agent, the coloring agent and the adhesive-repellent agent can be applied simultaneously to produce the separable layer in a simplified manner.

With a label sheet according to the invention and having an ink-made separable layer on the other surface, said ink containing an adhesive-repellent agent to a relatively low concentration so that additional information in the form of characters and/or patterns may be recorded on the separable layer, the separable layer is highly adapted to marking by means of a felt-tipped marker, a pencil or a stamp. Additionally, since a method of manufacturing a label sheet according to the invention involves the use of an ink-type adhesive-repellent agent for a separable layer, the separable layer may be formed on all or a selected area of a surface of the substrate by means of a conventional printing machine. If the ink-type adhesive-repellent agent is of an ultraviolet-ray-set type, the separable layer may be dried quickly by irradiating it with ultraviolet rays.

With a label sheet according to the invention and having an information recording section formed on an adhesive-repellent layer carrying surface of the substrate and an adhesive free section on the other surface of the substrate, the information, recording section may not be subjected to a stripping action so that it is more adapted for recording information.

With a label sheet according to the invention and forming part of a multi-layer structure of a number of such label sheets, said label sheet having an adhesive free section and an adhesive layer on a same surface thereof, the adhesive free section carrying an adhesive-repellent layer and being arranged in such a way that, if the label is folded along a center line, the area of the adhesive layer is put to contact exactly with the area of the adhesive-repellent layer and that the area of the adhesive layer on the underside of the label sheet exactly corresponds to the area of the adhesive-repellent layer of the upper side of an underlying label sheet, it may not stick to any objects if the overlying label sheet has been stripped off. If the area of the adhesive-repellent layer of each label sheet is exclusively used as a stub, it will make an excellent stub that would not stick to any objects. Additionally, since the area of the adhesive layer of each label sheet carries an adhesive along the opposite edges, it can be securely bonded to an object by the adhesive along the opposite edges.

DETAILED DESCRIPTION OF THE PREFERRED EMBODIMENTS

Now, the present invention will be described by referring to the accompanying drawings that illustrate preferred embodiments of the invention.

Figure 1:
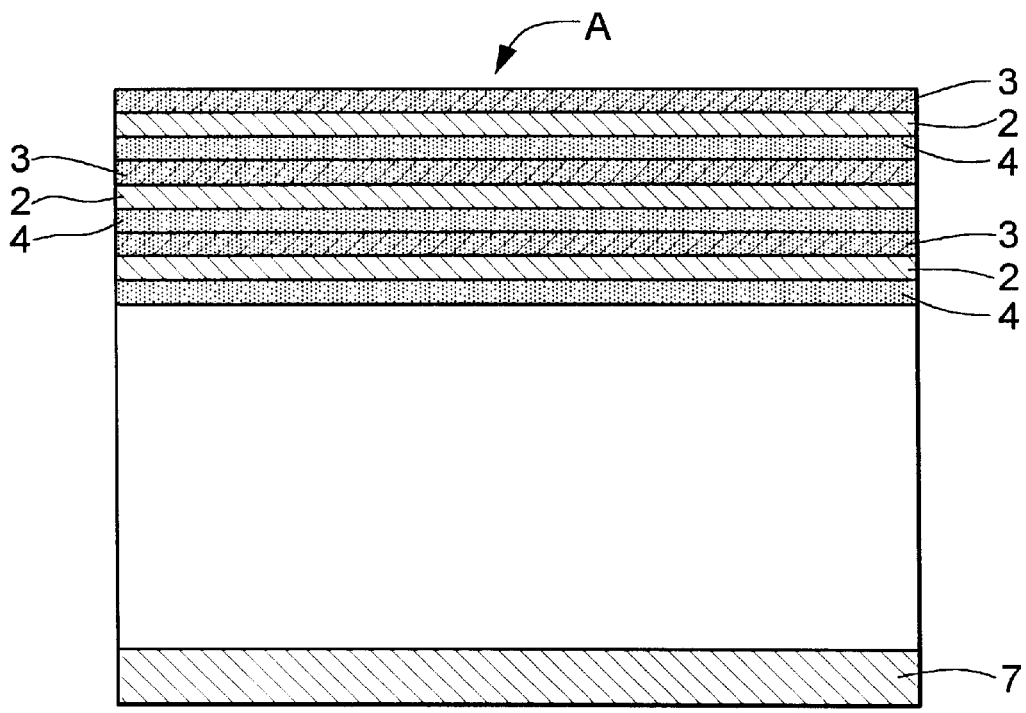
FIG. 1 is a cross sectional side view of a multi-layer structure of rectangular label sheets according to the invention.
Figure 2:
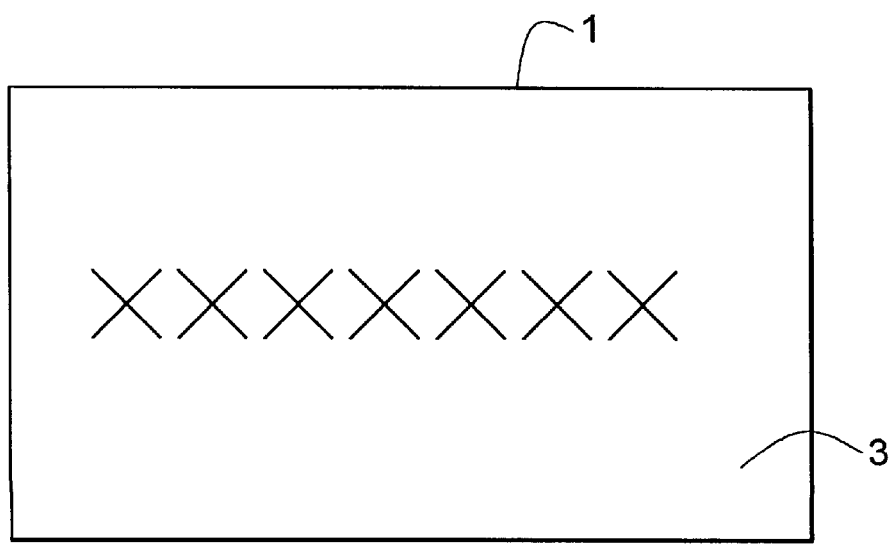
FIG. 2 is a top view of an embodiment of label sheet according to the invention.
Figure 3:
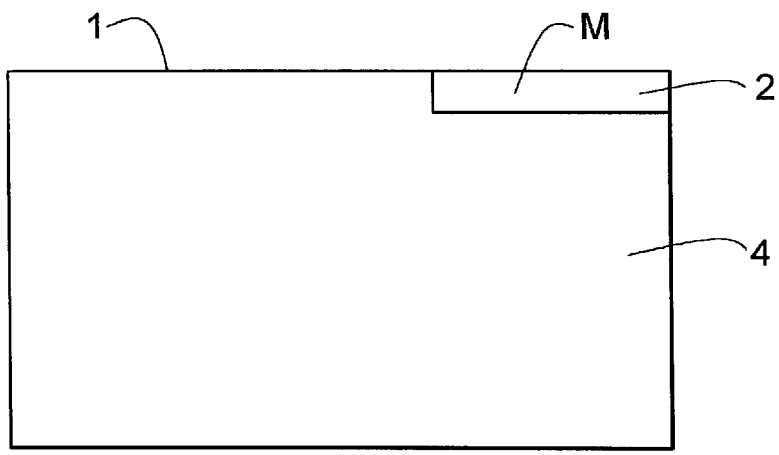
FIG. 3 is a bottom view of the embodiment of FIG. 2.
Figure 4:
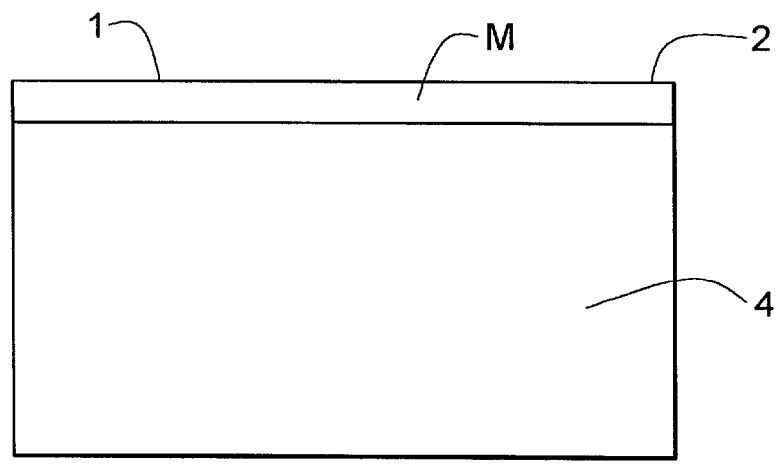
FIG. 4 is a bottom view of another embodiment of label sheet according to the invention.
Figure 5:
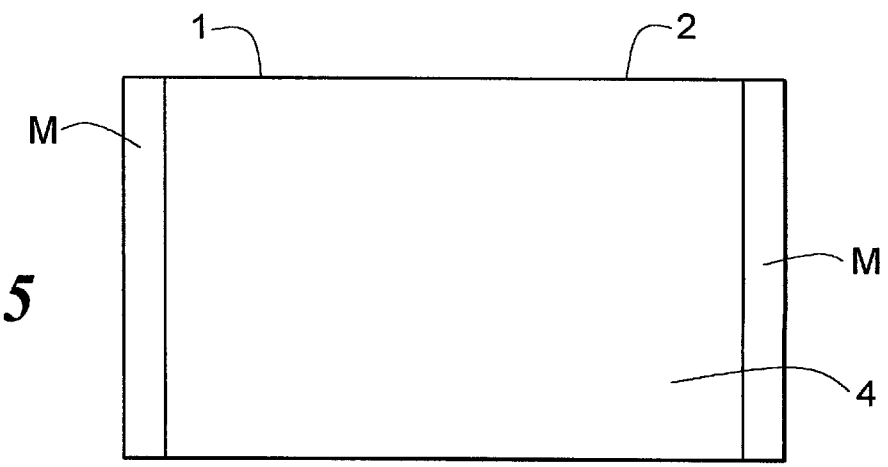
FIG. 5 is a bottom view of still another embodiment of label sheet according to the invention.

FIG. 1 is a cross sectional view of an embodiment of multi-layer structure A of label sheets according to the invention. FIG. 2 is a top view of an embodiment of rectangular label sheet according to the invention. FIG. 3 is bottom view of the embodiment FIG. 2, where an adhesive agent is applied to the entirely area to form an adhesive layer except a several millimeters wide adhesive free zone M that makes the label sheet to be easily separated from the multi-layer structure A with a finger tip. The label sheet 1 comprises a substrate 2 typically made of paper, synthetic paper or synthetic film, a separable layer 3 of a colored or transparent adhesive-repellent agent formed on a surface of the substrate 2 and an adhesive layer 4 formed on the other surface of the substrate 2. The-adhesive layer 4 of the label sheet is placed squarely on the separable layer 3 of an underlying label sheet and so on to form a multi-layer structure A, which is placed on the adhesive-repellent upper surface of a board 7 as shown in FIG. 1. While the adhesive free zone M is formed at a corner of the label sheet in FIG. 3, it may alternatively be arranged along the entire length of an edge of the label sheet as shown in FIG. 4. Still alternatively, a pair of adhesive free zones may be arranged respectively along opposite edges of the label sheet as shown in FIG. 5. The location and the size of the adhesive free zone may be determined as a function of the overall size and the profile of the label sheet 1.

Figure 6:
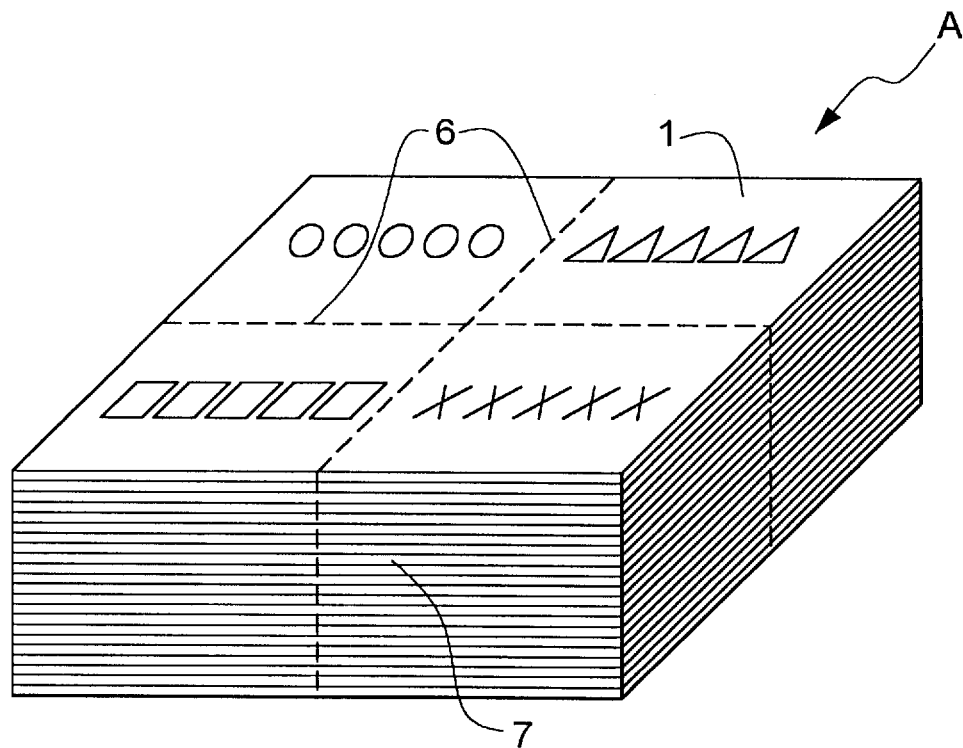
FIG. 6 is a perspective view of another multi-layer structure of rectangular label sheets according to the invention and having perforations for separating it into individual label sheets.

FIG. 6 is a schematic perspective view of a multi-layer structure A of label sheets, each layer being separable from the underlying layer and having four rectangular label sheets 1 that may be separated from each other along perforations 6. Although perforations are arranged to show a horizontal line and a vertical line in FIG. 6, they may alternatively arranged in a number of parallel rows. Each layer may comprise more than four label sheet. Preferably, each label sheet of each layer has an adhesive free section. Perforations are preferably formed along the center lines 6 of adhesive free sections. With this arrangement, no adhesive would stick to the perforator tip coming out of the multi-layer structure during the perforating operation and the adhesive free section of each label sheet provides a lug for separating the label sheet.

Now, a roll of label sheets according to the invention will be described by referring to FIGS. 7 through 10.

Figure 7:
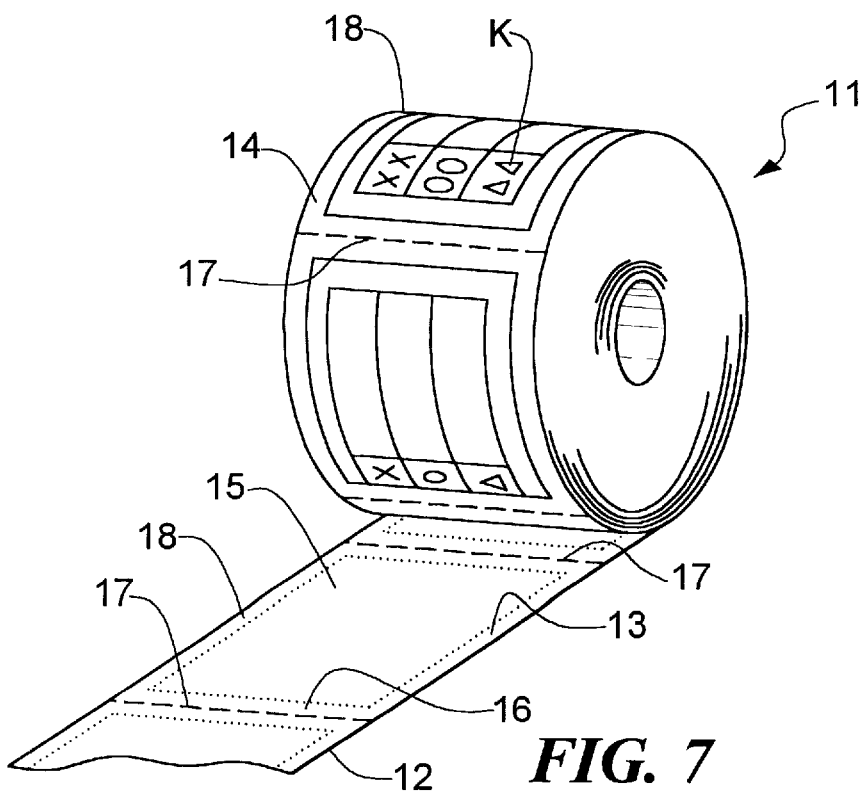
FIG. 7 in a schematic perspective view of a roll of rectangular label sheets according to the invention.
Figure 8:
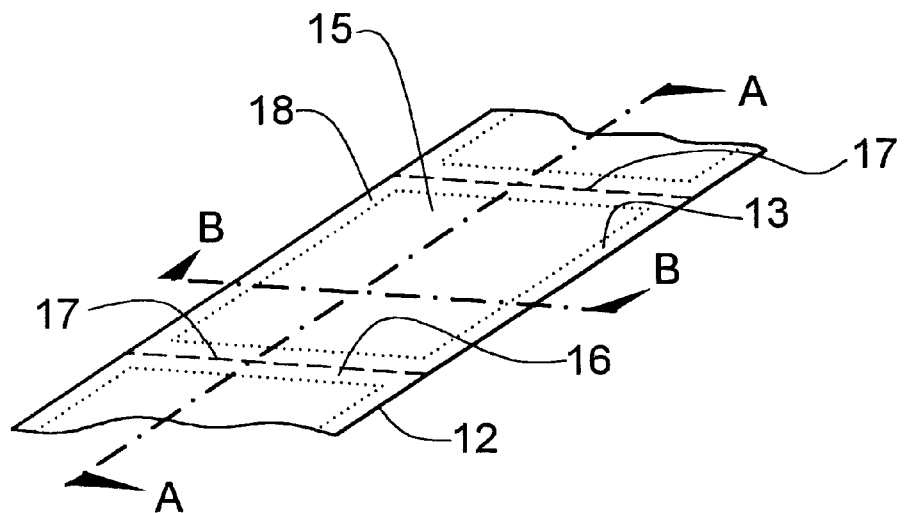
FIG. 8 is a perspective partial view of the roll of rectangular label sheets of FIG. 7.
Figure 9:
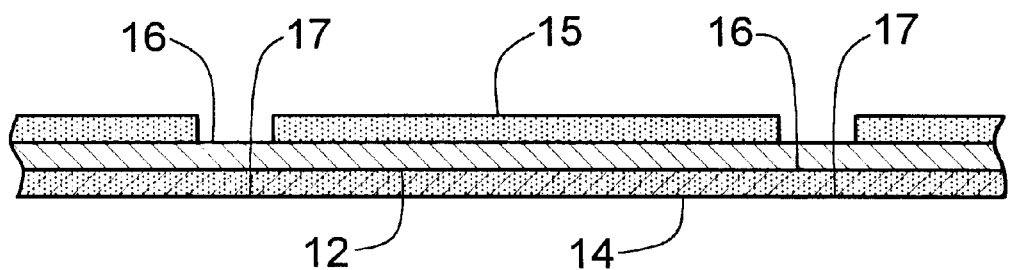
FIG. 9 is a cross sectional view of the embodiment of FIG. 8 taken along line A—A.
Figure 10:
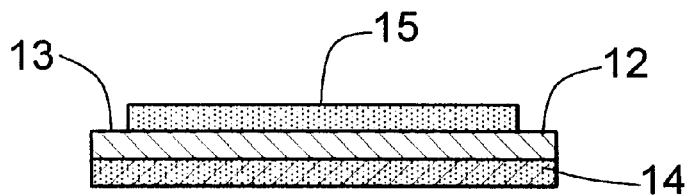
FIG. 10 is a cross sectional view of the embodiment of FIG. 8 taken along line B—B.

FIG. 7 is a schematic perspective view of a roll of label sheets and FIG. 8 is a perspective partial view of the roll of rectangular label sheets of FIG. 7. FIGS. 9 and 10 are cross sectional views of the embodiment of FIG. 8 taken along lines A—A and B—B respectively.

Assume that the label sheets 11 of the above embodiment are those used for delivering products to customers. A substrate 12 that is common to all the label sheets of the roll carries a (separable) layer 14 of a silicon-type adhesive-repellent agent on the outer surface thereof and a blank form K is printed on the surface of the separable layer 14 so that the name, the specifications and the number of the products to which the label is attached may be entered by hand writing or by means of a stamp. The substrate 12 also carries on the inner surface thereof a (adhesive) layer 13 of a pressure responsive adhesive agent that is divided into unit sections by adhesive free sections 16 arranged at regular intervals. A line of perforations 17 is formed along the center line of each adhesive free section 16 so that no adhesive would stick to the perforator tip coming out of the multi-layer structure during the perforating operation to improve the level of precision with which the perforations are formed. Additionally, since no adhesive agent exists around the perforations, no projections would be formed around them. The adhesive free sections 16 provide lugs for separating the respective label sheets.

Materials that can be used as adhesive-repellent agents for the purpose of the invention include water soluble silicon oil, silicon oil emulsion, silicon rubber emulsion and other silicon type water soluble repellent agents as well as water-repellent agents containing a Warner type chromium complex salt and water soluble polyethylene imine type non-silicon repellent agents. Ink type repellent agents containing repellent substances such silicon and/or wax may also be used. Unlike the above embodiment, the separable layer may not necessarily cover the entire outer surface of a label sheet according to the invention and it may alternatively be formed only in part thereof in such a way that it exactly correspond to the adhesive layer on the other side of the label sheet. An anti-adhesive-repellent agent is typically applied between the substrate and the adhesive-repellent agent. In other words, the separable layer 14 on the surface of a label sheet according to the invention normally comprises a layer of an anti-adhesive-repellent agent also such a layer is not necessarily required for the purpose of the invention.

Any ordinary adhesive agents and adhesive agents that allow separation and readhesion may be used for the purpose of the invention. The combination of an adhesive-repellent agent and an adhesive agent and the rates at which they are respectively applied depend on the application of the label, the material of the label substrate, the environment of the applied label and other considerations. The separable layer may be omitted depending on the adhesion of the adhesive agent.

Any paper including ordinary quality paper, coated paper and other synthetic paper may be used for the label substrate if such paper is feasibly used with adhesive-repellent agents, adhesive agents and ink type adhesive-repellent agents selected for the purpose of the invention.

Adhesive free sections 16 also extend along the longitudinal edges of the label sheets 11 of the above embodiment.

These sections may be advantageous when a wide roll of label sheets is firstly prepared and then cut into a plurality of unit rolls because the cutter would remain free of the adhesive agent and the latter would not flow out of the lateral sides of the roll during storage.

An ink type adhesive-repellent agent is preferably used for the above embodiment. Ink type adhesive-repellent agents that can be used for the purpose of the invention are those containing a proper adhesive-repellent agent by a concentration lower than that or a conventional ink type adhesive-repellent agent or less than 85 to 95% by weight. An ink type adhesive-repellent agent contains as principal ingredients a vehicle, a coloring agent, an adhesive-repellent agent and a promoter agent. The vehicle contains a drying oil, a synthetic resin, a solvent and a plasticizer. Materials that can be used for the vehicle may be those that can be used for ultraviolet-ray-set type ink and include oligomers such as polyesateracrylate, epoxyacrylate, urethaneacrylate, polyoleacrylate, reactive diluents, monofunctional monomers such as photopolymerizable monomers, polyfunctional monomers and photopolymerization initiators. The vehicle is preferably an ultraviolet-ray-set type repellent overprint varnish containing acrylic acid ester resin as a principal ingredient. The vehicle is applied to the outer surface of the label sheet substrate and then made to set by irradiating ultraviolet rays to produce a layer. The coloring agent may be an organic or inorganic pigment. The promoter agent may be a drying agent or compound.

These ingredients are mixed to a ratio where the adhesive-repellent agent occupies 5 to 30% by weight of the entire mixture. If the content of the adhesive-repellent agent is less than 10% by weight, the product would not show any adhesive-repellent property so that the adhesive layer and the separable layer would be firmly-bonded together to make the product total useless. If, on the other hand, the content of the adhesive-repellent agent is greater than 35% by weight, the mixture hardly operates as ink and no marking would become possible by means of such a mixture. Preferably the content of the adhesive-repellent agent is between 15 and 25% by weight and more preferably it is between 18 and 22% by weight. A recommendable mixing ratio of the vehicle, the coloring agent, the adhesive-repellent agent and the promoter agent would be 70%, 10%, 15% and 5% by weight respectively. With such a ratio, the mixture will operate both as ink and as an adhesive-repellent agent so that the overall thickness and the manufacturing cost of the label sheet would be significantly reduced.

As the ink type adhesive-repellent agent of a label sheet according to the invention contains less silicon than a conventional adhesive-repellent agent, its adhesive-repelling effect is slightly lower than that of the conventional agent, although this advantage can be compensated by selecting appropriate rates for applying the adhesive-repellent agent and/or the adhesive agent. More specifically, the adhesive-repellent agent may be applied at a rate higher than that of the conventional agent. Alternatively or simultaneously, the rate of application of the adhesive agent may be reduced without adversely affecting the adhesion of the agent because of the fact that it is typically of an acryl or rubber type. Thus, the problem of a lower adhesive-repelling effect of a label sheet according to the invention can be dissolved with ease by selecting appropriate rate for applying the adhesive-repellent agent and/or the adhesive agent.

For the purpose of the invention, the ink type adhesive-repellent agent may be applied to the entire outer surface or a selected area of the outer surface of the substrate of a label sheet. If it is applied only to a selected area, a conventional adhesive-repellent agent may be applied to the remaining surface area. There is no specific limit for the size of the selected area and the size may be determined depending on the application of the label sheet. Alternatively, a conventional adhesive-repellent agent may be applied to the entire outer surface of the substrate of a label sheet and the ink type adhesive-repellent agent may be applied to a selected area of the surface of the layer of the conventional adhesive-repellent agent.

The separable layer 3 or 14 may be formed by printing the entire surface of the outer surface of the label sheet 2 of 12 with an ink type adhesive-repellent agent or by printing a pattern and/or characters with a color ink type adhesive-repellent agent on the outer surface and then coating the pattern and/or characters with a transparent ink type adhesive-repellent agent so that the outer surface of the substrate of the label sheet 2 or 12 may carry a plurality of ink layers.

Now, the relationship between the adhesion of a label sheet according to the invention and the unwinding force required to feed forward a roll of label sheets according to the invention. In an experiment, coated paper and quality paper were used for the substrate and an ink type adhesive-repellent agent layer was formed on the outer surface of the substrate by applying an ultraviolet-ray-set type repellent overprint varnish (UP200-trade name: available from T&K TOKA Co., Ltd.) comprising as a principal ingredient acrylic acid ester that contained silicon by 20% by weight at a rate of 1.5 g/m$^2$ by means of a resin printing block to prepare a roll of label sheets. The unit label sheets were defined by perforations and an acryl type adhesive agent was applied at a rat of 10.0 g/m$^2$ to the entire inner surface of the substrate except areas surrounding the perforations to produce an adhesive layer.

The prepared roll of label sheets was used by unwinding the roll and ripping off the front end label sheet from the roll so that it was ready to be applied to a packaged product.

The force required to unwind the roll at a low rate and separate the front end label sheet from the roll (as define by JIS-Z0237; A low value represents easy separation.) and the adhesion per unit length of each unit label sheet when applied to a stainless steel plate (as defined by JIS-Z0237; a higher value represents strong adhesion.) were measured. Table 1 below shows the results of the experiment.

TABLE 1

| No. | Label Substrate | Adhesive Agent Appl. Rate (g/m$^2$) | Adhesive-repellent Appl. Rate (g/m$^2$) | Adhesion (A) (g/25 mm) | Low Speed Unwinding Force (g/25 mm) | A/B |
|---|---|---|---|---|---|---|
| 1 | coated paper | 10.0 | 1.5 | 131 | 18 | 7.3 |
| 2 | " | 10.5 | 2.5 | 180 | 58 | 3.2 |
| 3 | " | 10.5 | 2.5 | 199 | 55 | 3.6 |
| 4 | " | 11.0 | 2.0 | 243 | 39 | 6.2 |
| 5 | " | 11.5 | 2.0 | 257 | 31 | 8.3 |
| 6 | " | 12.5 | 2.5 | 299 | 45 | 6.6 |
| 7 | " | 14.0 | 2.5 | 313 | 56 | 5.6 |

TABLE 1-continued

| No. | Label Substrate | Adhesive Agent Appl. Rate (g/m²) | Adhesive-repellent Appl. Rate (g/m²) | Adhesion (A) (g/25 mm) | Low Speed Unwinding Force (g/25 mm) | A/B |
|---|---|---|---|---|---|---|
| 8 | " | 15.0 | 3.0 | 451 | 60 | 7.5 |
| 9 | quality paper | 12.0 | 1.0 | 216 | 122 | 1.8 |
| 10 | " | 13.5 | 2.5 | 310 | 90 | 3.4 |
| 11 | " | 14.0 | 2.5 | 360 | 96 | 3.8 |
| average of coat. pa. | | 12.0 | 2.3 | 269 | 45 | 5.8 |
| average of qual. pa. | | 13.0 | 2.0 | 295 | 103 | 2.9 |
| conventional paper | | — | — | 300 | 50–80 | 6–3.8 |

As shown In Table 1 above, the force required to unwind a unit label sheet from the roll of label sheets was about 103 g/ 25 mm of width in average if quality paper was used for the label substrate, whereas the value for a roll of comparable conventional label sheets was about 80 g/25 mm of width, meaning that a label sheet according to the invention may require a slightly greater force as compared with a conventional one, although the former did not provide any problems such as bonding of the bonded separable layer and the adhesive layer in practical applications. With a label sheet according to the invention and using synthetic paper for the label substrate, the force required to unwind it was 45 g/25 mm of width in average, whereas the value for a roll of comparable conventional label sheets was about 50/25 mm of width to prove that the both were undiscriminable in practical applications.

The adhesion of each unit label sheet having a width of 25 mm was tested by applying it to a stainless steel plate and stripping it off from the plate after five minutes with an instrument similar to the one used for determining the force for unwinding each label sheet. As a result of the experiment, it was found that the average adhesion was 295 g/25 mm of width for label sheets using quality paper for the substrate and 259/25 mm of width for those using coated for the substrate. While these values were slightly lower than the average of comparable conventional label sheets, which was about 300 g/25 mm of width, the differences are insignificant and the specimens did provide any problem in practical applications.

All the specimens in the table were good for marking by hand or by means of a stamp and felt-tipped markers can be used with them. The ratios of the adhesion and the low speed unwinding force is closely related to the adaptability of the specimens to marking by hand and by means of a stamp. More specifically, a high ratio of the adhesion to the low speed unwinding force represents a high separability and a poor adaptability to marking. For example, if the ratio of the adhesion to the low speed unwinding force of a specimen is less than 1.5, it shows an excellent adaptability to marking and a poor separability. If, to the contrary, the ratio exceeds 8.5, the specimen would not show any adaptability to marking although it has an excellent separability. Thus, the ratio of the adhesion and the low speed unwinding force needs to be found between 1.5 and 8.5, preferably between 2.5 and 7.5 and more preferably between 3 and 7.

Figure 11:
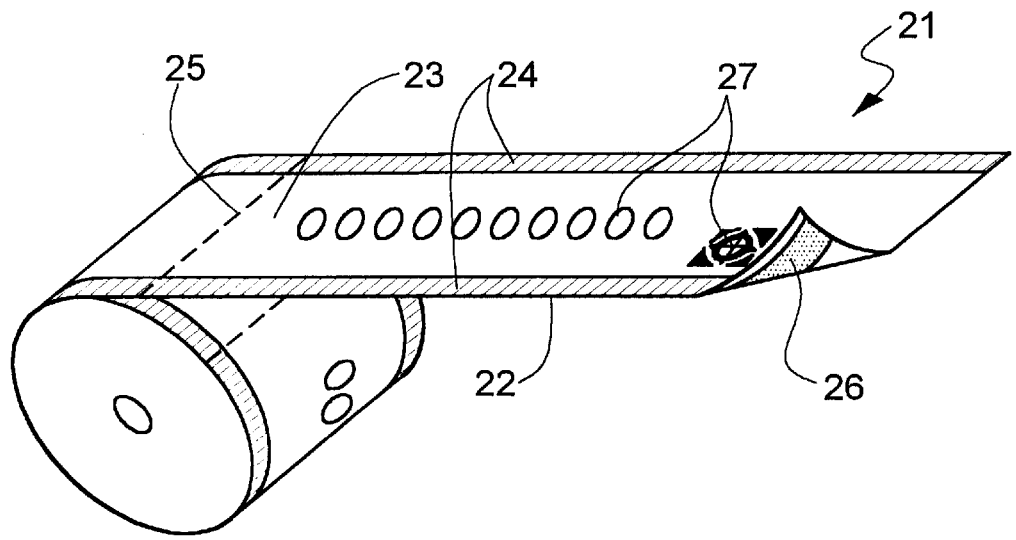
FIG. 11 is a schematic perspective view of another roll of rectangular label sheets according to the invention.
Figure 12A:
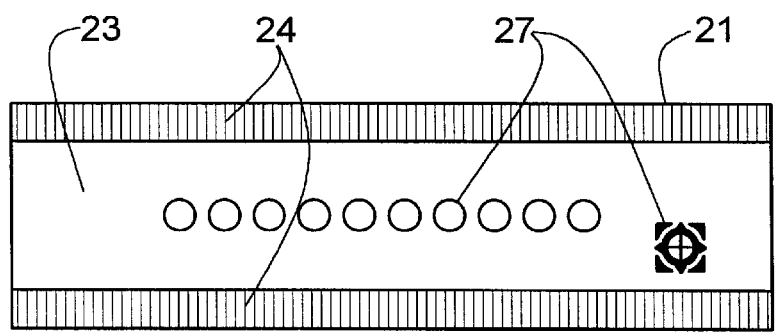
FIGS. 12(a) and 12(b) are top and bottom views of a label sheet according to the invention, illustrating how they correspond geometrically and functionally.
Figure 12B:
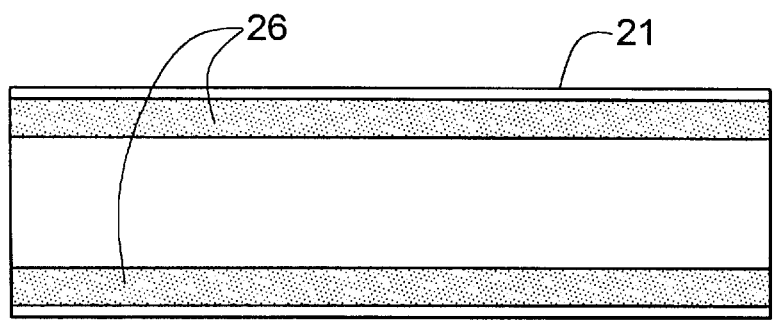
Figure 13:
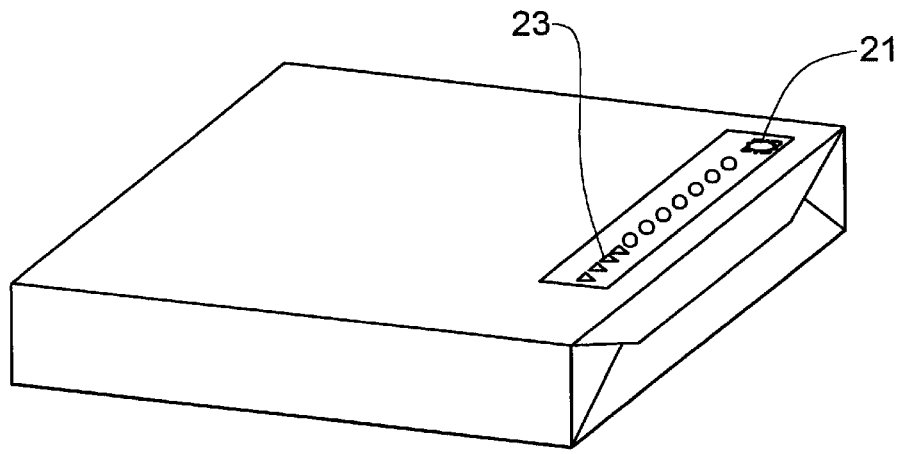
FIG. 13 is a perspective view of a package to which a label sheet according to the invention is applied.

Now, another embodiment of the present invention will be described by referring to FIGS. 11 through 13. FIG. 11 shows a roll of strip-shaped label sheets 21 comprising a substrate 22 typically made of a roll of paper that carries on the outer surface printed characters and patterns 27 and blank areas 23 and adhesive-repellent sections 24. The roll is also provided with lines of perforations 25 arranged at regular intervals to define individual unit label sheets. More specifically, as shown in FIG. 12(a), the blank areas 23 are located along the center line of the substrate 22 and flanked with a pair of lateral adhesive-repellent sections 24. Each unit label sheet carries a set of characters and a pattern 27 that are arranged appropriately by printing on the outer surface thereof regardless of the locations of the blank area 23 and the adhesive-repellent sections 24. FIG. 12(b) shows the inner surface of the substrate 22, which carries longitudinal adhesive sections in areas exactly correspond to the adhesive-repellent sections on the outer surface of the substrate 22.

As the substrate 22 is wound to form a roll with the outer surface exposed to the atmosphere, the adhesive sections 26 come to be held in contact with and covered by respective adhesive-repellent sections 24. When feeding out the roll of label sheets, the adhesive sections 26 will easily be separated from the corresponding adhesive-repellent sections 24 by simply pulling the front end of the roll 80 that no particular effort will be required for unwinding the roll. As the front end label sheet 21 in ripped off from roll along the line of perforations 25 defining its boundary, it becomes ready to be applied to the package of a product by way of the adhesive sections 26 on the back side of the label sheet 21 and characters and patterns may be marked on the blank area 23 of the label sheet regardless. If the substrate is made of a material that can pass the ink applied to the blank area 23 through itself until the ink can contaminate the package and the product inside the package or the adhesive agent applied to the back side of the label sheet can pass through the substrate 22 to come to the surface and lose its proper adhesion, a filling material may be applied to the inner surface of the substrate 22 in advance. Alternatively, the lateral adhesive sections 26 may be arrange of the lateral edges of the substrate 22 so that no adhesive agent would flow out of the lateral sides of the roll. The adhesive sections 26 may not necessarily be formed as continuous strips and may alternatively be realized in the form of a number of spots. With the above embodiment of roll of label sheets, the front end label sheet 21 is ripped off from the roll along the boundary line of perforations 25 and any necessary additional information such as the name and the address of the receptor of the package is entered into the blank area and then applied to the package by means of the adhesive sections 26 of the back aide of the label sheet 21 as shown in FIG. 13.

Figure 14:
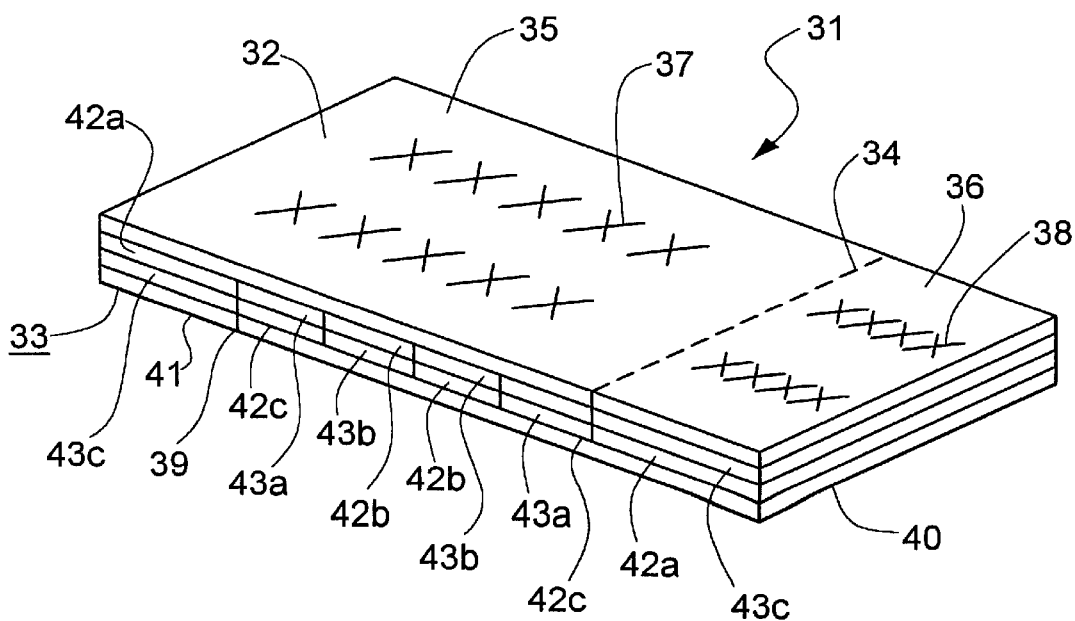
FIG. 14 is a perspective view of an embodiment of overlap type label sheet according to the invention.
Figure 15:
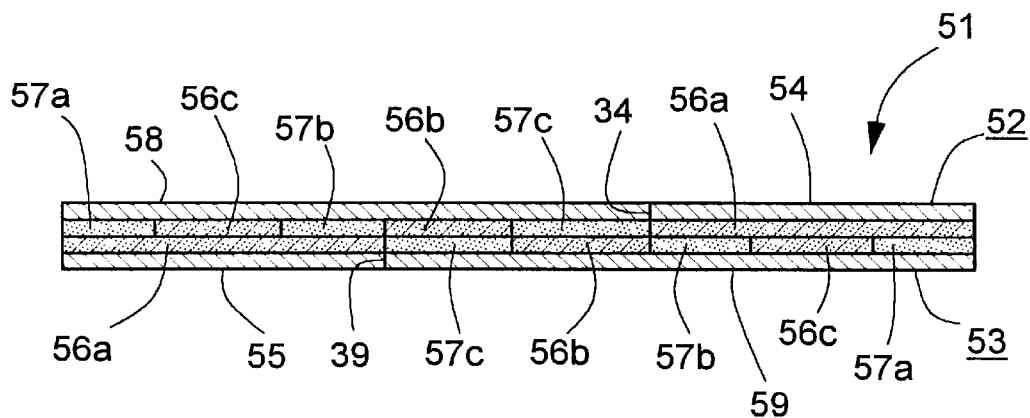
FIG. 15 is a cross sectional view of another embodiment of overlap type label sheet according to the invention.

A still other embodiments of the invention will be described by referring to FIGS. 14 through 17. FIG. 14 is a sectional view of a first one of the embodiments and FIG. 15 is a sectional view of a second one of the embodiments, whereas FIGS. 16 and 17 respectively show third and forth ones of the embodiments in cross section.

Referring to FIG. 14, the embodiment is an overlap type label sheet 31 comprising an upper label sheet 32 and a lower label sheet 32, of which the upper label sheet 32 can be separated into an adhesive slip 35 and a stub 36 along a line of perforations 34. The adhesive slip 35 is designed as a label of a product and carries on the outer surface thereof information 37 concerning the product including the name, the product number and the specifications of the product in printed characters. Likewise, the stub 36 also carries on the outer surface there information 38 concerning the product. The lower label sheet 33 has a configuration same as that of the upper label sheet 32 and can be separated into an adhesive slip 40 and a stub 41 along a line of perforations 49.

The adhesive slip 35 of the upper label sheet 32 carries on the back side thereof strip-shaped adhesive areas 42a, 42b, 42c formed by applying a strong adhesive agent such as an acrylic two solution cross-linking type adhesive and strip-shaped adhesive-repellent areas 43a, 43b formed by applying silicon, said adhesive areas and said adhesive-repellent areas being arranged in an alternating manner. On the other hand, the stub 36 of the upper label sheet 32 carries on the back side thereof an adhesive-repellent area 43c covering the entire surface of the back side. The adhesive areas 42a, 42b, 42c and the adhesive-repellent areas 43a, 43b, 43c are arranged in such a way that, when the upper label sheet 32 is folded along the center line or the separating the adhesive area 42b and the adhesive-repellent area 43b, the adhesive are 42a, 42c and 42b respectively come into contact with the adhesive-repellent areas 43a, 43c and 43b. The adhesive areas 42c and 42a of the adhesive slip 35 are respectively located at the edges close to and remote from the stub 36.

On the other hand, the lower label sheet 33 has a configuration same as that of the upper label sheet 32 and carries on the back side thereof strip-shaped adhesive areas 42a, 42b, 42c formed by applying a strong adhesive agent such as an acrylic two solution cross-linking type adhesive and strip-shaped adhesive-repellent areas 43a, 43b formed by applying silicon. The upper and lower label sheets 32 and 33 are put together so that the adhesive areas 42a, 42c and 42b are respectively held in contact with the adhesive-repellent areas 43c, 43a and 43b.

With the above arrangement, the adhesive areas 42a, 42b and 42c of each of the overlap type label sheets 32 and 33 are constantly covered and protected respectively by the corresponding adhesive-repellent areas 43a, 43b and 43c so that the use of particularly prepared cover sheets is not required. To use the overlap type label sheet 31, the upper label sheet 32 is stripped off from the lower label sheet 33 and then the stub 36 is ripped off from the adhesive slip 35 along the perforations 34. Thereafter, the adhesive slip 35 is applied to the package (not shown) containing a right product represented by the information 37 on the surface by way of the exposed adhesive areas 42a, 42b and 42c. Since the back side of the stub 36 is totally occupied by the adhesive-repellent area 43c, it can be handled without difficulty, while the adhesive slip 35 firmly sticks to the package by way of the two lateral adhesive areas 42a and 42c and would not accidentally come off from the package.

The lower label sheet 33 that is left unused can be stored by folding it into two halves along the center line thereof or the boundary line of the adhesive 42b and the adhesive-repellent area 43b so that the adhesive areas 42a, 43a and 43b comes into contact with the adhesive-repellent areas 43c, 43a and 43b respectively. Under this condition, the folded lower label sheet 33, the adhesive areas 42a, 42b and 42c are covered and would not accidentally stick to any object. Additionally, since the adhesive areas can be easily peeled off from the cover, the label sheet becomes ready for use any time.

Now, the second embodiment will be described by referring to FIG. 15. This embodiment of overlap type label sheet differs from the first embodiment only in that the adhesive areas 57a, 57b and 57c and the adhesive-repellent areas 56a, 56b and 56c of this embodiment are arranged differently from their counterparts of the first embodiment. More specifically, not only the adhesive areas 57a and 57b but also the adhesive-repellent area 56c on the back side of each of the adhesive slips 56 and 59 of the upper and lower label sheets 52 and 53 are contained within a portion that corresponds to each of the adhesive-repellent areas 56a on the back side of the stubs 54 end 55. Otherwise, the embodiment is exactly same as the above described first embodiment and therefore would not be described here any further. Not that each of the label sheets 52 and 53 can be folded into two halves along the center line or the boundary line of the adhesive area 57c and the adhesive-repellent area 56b.

Figure 16:
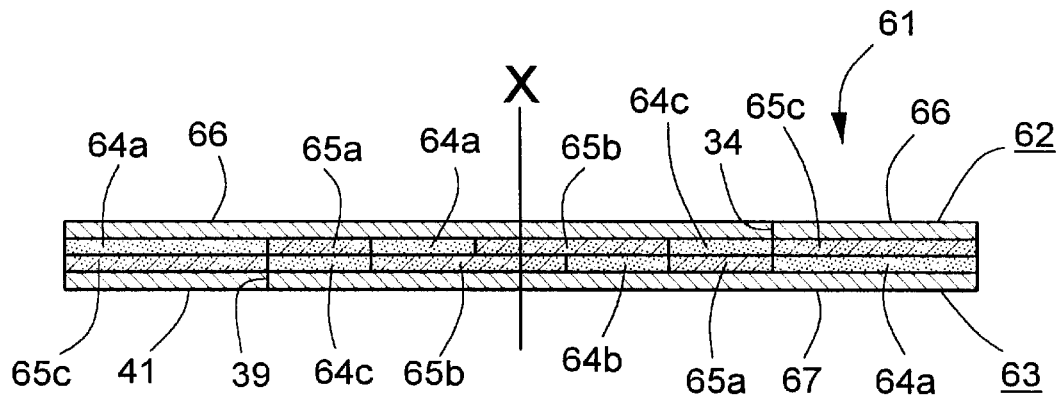
FIG. 16 is a cross sectional view of still another embodiment of overlap type label sheet according to the invention.

The third embodiment will then be described by referring to FIG. 16. This embodiment of overlap type label sheet differs from the above described first embodiment only in that the adhesive areas 67a, 67b and 67c and the adhesive-repellent areas 66a, 66b and 66c of this embodiment are arranged differently from their counterparts of the first embodiment. More specifically, the adhesive-repellent areas 65b, 65b arranged on the back sides of the respective adhesive lips 66, 67 of the upper and lower label sheets 62 and 63 partly contact with each other. With this arrangement, each of the label sheets 62 and 63 can be folded into two halves along an imaginary line passing through of the adhesive-repellent area 65b arranged at the middle of the label sheet 62 or 63.

Figure 17:
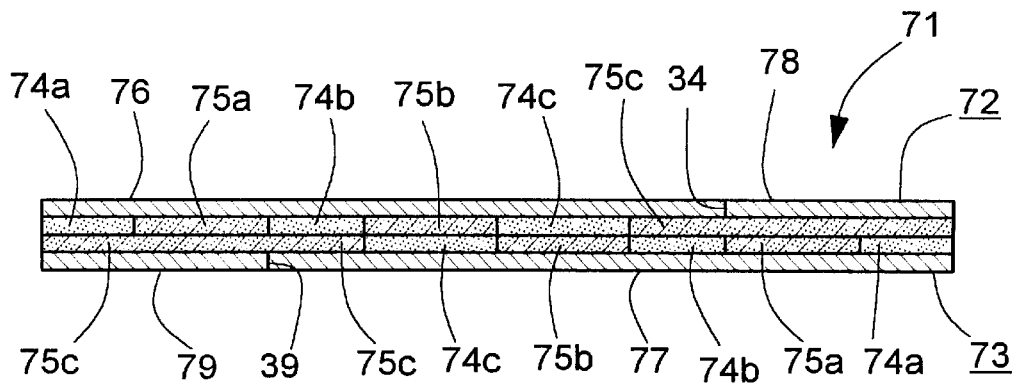
FIG. 17 is a cross sectional view of a further embodiment of overlap type label sheet according to the invention.

Finally, the fourth embodiment will be described by referring to FIG. 17. This embodiment of overlap type label sheet differs form the above described first embodiment only in that the adhesive areas 74a, 74b and 74c and the adhesive-repellent areas 75a, 75b and 75c of this embodiment are arranged differently from their counterparts of the first embodiment. More specifically, the adhesive-repellent area 75c arranged on the back side of each of the stubs 78, 79 of the upper and lower label sheets 72 and 73 is extended into the adjacent adhesive slip 76 or 77 and not only the adhesive areas 74a and 75b but also the adhesive-repellent area 75a on the back side of each of the adhesive slips 76 and 77 of the upper and lower label sheets 72 and 73 are contained within a portion that corresponds to each of the adhesive-repellent areas 76c on the back side of the stubs 78 and 79. With this arrangement, each of the label sheets 72 and 73 can be folded into two halves along the center line or the boundary line of the adhesive area 75b and the adhesive-repellent area 74c and, at the same time, only the adhesive slip 76 of the upper label sheet 74 can be folded into two halves along the center line or the boundary line of the adhesive-repellent area 75b and the adhesive area 74b, while only the adhesive slip 77 of the lower label sheet 78 can also be folded into two halves along the center line or the boundary line of the adhesive-repellent area 75b and the adhesive area 74b.

An overlap type label sheet that comprises only adhesive slips may also be realized. An adhesive slip and a corresponding stub may be separated by means of perforations as described above or, alternatively, by means of a specifically designed cutting line. Adhesive areas and adhesive-repellent areas may be arranged to form a checkered pattern in place of a striped pattern as in the case of the above embodiments.

It may be needless to say an overlap type label sheet according to the invention may fined applications other than a label for delivery.

Finally, a method of manufacturing a label sheet according to the invention will be described by way of a roll of label sheets. Although a method of manufacturing a label sheet according to the invention is not limited thereto and may be modified appropriately so long as such modification meets the requirements of the invention.

Figure 18:
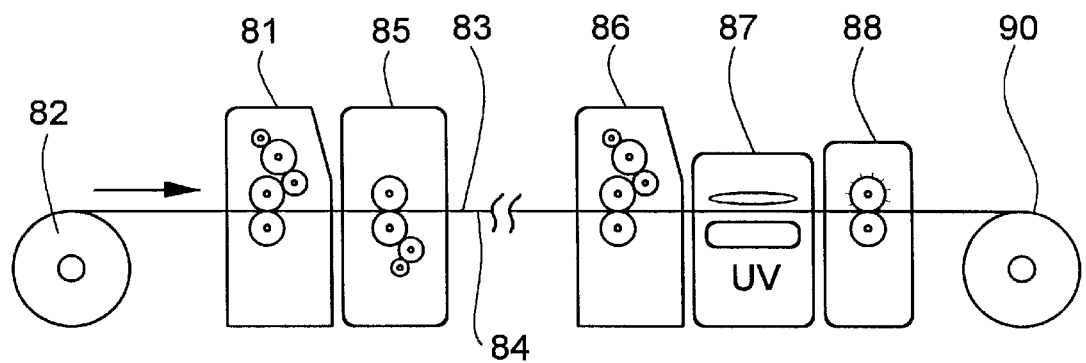
FIG. 18 is a schematic flow chart of a method of manufacturing a label sheet according to the invention.
Figure 19:
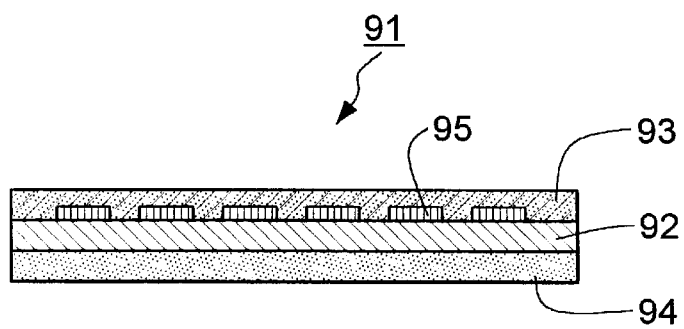
FIG. 19 is a cross sectional view of a conventional label sheet.

Referring to FIG. 18, with a method of manufacturing a label sheet according to the invention, a label sheet substrate 84 fed out from a substrate roll 82 is made to enter a printing unit 81 of an offset printing machine, where necessary characters and patterns are printed on the outer surface 83 of the substrate. Then, the substrate 83 is made to proceed to an adhesive application unit 85, where an acrylic type adhesive is applied to the entire inner surface of the substrate 84 and, if necessary, the applied adhesive agent is dried to set by an appropriate dryer (not shown).

Then, an adhesive-repellent agent is applied to the printed outer surface of the label sheet substrate in an adhesive-repellent application unit 86. An ordinary printing machine such as a resin block type printing machine may be used if the adhesive-repellent agent is an ink type adhesive-repellent agent. The rate of application of the adhesive-repellent agent is typically between 1 and 5 g/cm$^2$. If the operation of printing characters and patterns is also carried out by using an ink type adhesive-repellent agent, the above described printing step may be omitted.

In a subsequent step of drying and setting the applied ink type adhesive-repellent agent, an ultraviolet-ray-set type repellent overprint varnish (UP200-trade name: available from T&K TOKA Co., Ltd.) is used in this embodiment so that the ink is dried to set through ultraviolet ray irradiation by means of an ultraviolet ray irradiation unit 87. Then, perforations are formed by means of a perforator 88 to clearly define individual label sheets and then taken up to make a finished roll of label sheets 90.

What is claimed is:

1. A label sheet comprising:
   a substrate carrying on a surface thereof an adhesive layer, wherein said adhesive layer is formed only on a limited area of the surface;
   optionally, said substrate comprising an area where perforations are formed;
   an adhesive free zone which is the remainder of said surface and which zone is selected from the group consisting of an area where perforations are formed, and an area along one or more edges of said substrate, and combinations thereof;
   wherein the other surface is used for recording information and carries an adhesive repellant layer formed by applying an ink based adhesive repellant agent comprising an adhesive repellant agent and a coloring agent,wherein said ink based adhesive repellant agent is an ultraviolet-ray-set repellant overprint varnish comprising between 10 and 30% by weight of adhesive repellant agent based on the weight of the varnish.

2. A label sheet according to claim 1, wherein said label sheet constitutes part of a larger label sheet wound in the form of a roll.

3. A label sheet according to claim 1, wherein said adhesive-repellant layer is used as an information recording layer for recording information by printing said information by use of said ink based adhesive-repellant agent.

4. A label sheet according to claim 1, wherein said adhesive-repellant layer is adapted to marking by hand and/or by means of a stamp.

5. A label sheet according to claim 4, wherein said label sheet constitutes part of a larger label sheet wound in the form of a roll and the ratio of said label sheet's adhesion force per unit width in grams per millimeters required to remove said label sheet from a stainless steel plate and the adhesion force per unit width in grams per millimeters required to unwind said label sheet from said roll at a low speed is between 1.5 and 8.5.

6. A label sheet according to claim 1, wherein said adhesive repellant agent is a silicon based adhesive-repellent agent.

7. A label sheet according to claim 1, wherein an adhesive-repellant free blank section is formed on the adhesive-repellent layer carrying side of said substrate and an adhesive free section corresponding to said adhesive-repellant free section is formed on the adhesive layer carrying side of the substrate.

8. A label sheet according to claim 7, wherein said label sheet is part of a longer strip-shaped label sheet wound in the form of a roll and clearly defined by perforations.

9. A label sheet according to claim 8, wherein said adhesive-repellant layer includes two sections arranged respectively along the longitudinal edges of the substrate and the adhesive layer includes either two sections arranged respectively along the corresponding sections of the adhesive-repellent layer or a number of spots arranged along said corresponding sections.

10. A method of manufacturing the label sheet according to claim 1, wherein said method comprises steps of applying an adhesive agent to a surface of a substrate so as to form an adhesive layer only on a limited area of the surface with the remainder of said surface being an adhesive free zone, applying an ink based adhesive-repallant agent on the other surface of the substrate, and drying and setting said ink based adhesive-repellant agent so as to form an adhesive repellant layer, wherein said ink based adhesive-repellant agent is an ultraviolet-ray-set repellant overprint varnish comprising between 10 and 30% by weight of adhesive repellant agent based on the weight of the varnish.

11. A method of manufacturing a label sheet according to claim 10, wherein said adhesive repellant layer is adapted to marking by hand and/or by means of a stamp.

12. A label sheet comprising two component label sheets, each component label sheet comprising a substrate carrying on a surface thereon an adhesive layer, wherein said adhesive layer is formed only on a limited area of each substrate and an adhesive-repellant agent is applied to the adhesive-free areas on the adhesive layer carrying side of each substrate in such a way that, when each component label sheet is separated from the other component label sheet and folded into two halves, the areas carrying the adhesive layer are respectively held in contact with the corresponding areas carrying the adhesive-repellant agent, and that the two component label sheets are put together in such a way that the areas carrying the adhesive layer of either one of the component label sheets are respectively made to contact with the areas carrying the adhesive-repellant agent of the other component label sheet, and wherein the adhesive-repellant agent is applied using an ink-based adhesive repellant agent comprising a coloring agent and between 10% and 30% by weight of the adhesive repellant agent based on the weight of the ink-based adhesive repellant agent.

13. A label sheet according to claim 12, wherein each of said component label sheets comprises an adhesive slip separable from a stub by means of a line of perforations.

14. A label sheet according to claim 13, wherein the stub of each of the component label sheets is provided only with an adhesive-repellent area on a back thereof.

15. A label sheet according to claim 13, wherein adhesive areas are arranged on a back of the adhesive slip of each of the component label sheets respectively at locations close to and remote from the corresponding stub.

* * * * *

UNITED STATES PATENT AND TRADEMARK OFFICE
CERTIFICATE OF CORRECTION

PATENT NO.    : 6,037,042
DATED         : March 14, 2000
INVENTOR(S)   : Takahiro Kato et al.

It is certified that error appears in the above-identified patent and that said Letters Patent is hereby corrected as shown below:

Title page,
Item [75], Inventors, "Yoshiyki" should read -- Yoshiyuki --;
"Sendai" should read -- Shinagawa-ku --;
"Tsurugashima" should read -- Tsurugashima-Shi --;

Column 1,
Line 49, "drawing n" should read -- drawings --;

Column 2,
Line 4, "s" should read -- a --;
Line 42, "65" should read -- 85 --;

Column 5,
Line 46, "The-adhesive" should read -- The adhesive --;
Line 66, "sheet" should read -- sheets --;

Column 7,
Line 18, "polyesateracrylate" should read -- polyesteracrylate --;

Column 10,
Line 36, "80" should read -- 50 --;
Line 62, "aide" should read -- side --;

Column 12,
Line 16, "end" should read -- and --; and

Column 14,
Line 43, "thereon" should read -- thereof --.

Signed and Sealed this

Twelfth Day of March, 2002

*Attest:*

*Attesting Officer*

JAMES E. ROGAN
*Director of the United States Patent and Trademark Office*